(12) United States Patent
Van Phan et al.

(10) Patent No.: US 10,660,018 B2
(45) Date of Patent: *May 19, 2020

(54) DEVICE-TO-DEVICE COMMUNICATION

(71) Applicant: Nokia Technologies Oy, Espoo (FI)

(72) Inventors: Vinh Van Phan, Oulu (FI); Ling Yu, Kauniainen (FI); Kari V. Horneman, Oulu (FI); Ottmar Aumann, Munich (DE)

(73) Assignee: Nokia Technologies Oy, Espoo (FI)

( * ) Notice: Subject to any disclaimer, the term of this patent is extended or adjusted under 35 U.S.C. 154(b) by 493 days.

This patent is subject to a terminal disclaimer.

(21) Appl. No.: 15/221,771

(22) Filed: Jul. 28, 2016

(65) Prior Publication Data

US 2016/0337943 A1 Nov. 17, 2016

Related U.S. Application Data

(62) Division of application No. 14/793,807, filed on Jul. 8, 2015, now Pat. No. 9,432,914, which is a division
(Continued)

(51) Int. Cl.
*H04W 48/10* (2009.01)
*H04W 72/02* (2009.01)
(Continued)

(52) U.S. Cl.
CPC ............ *H04W 48/10* (2013.01); *H04W 4/06* (2013.01); *H04W 8/005* (2013.01); *H04W 48/12* (2013.01);
(Continued)

(58) Field of Classification Search
CPC ....... H04W 48/12; H04W 48/10; H04W 4/06; H04W 72/02; H04W 72/048;
(Continued)

(56) References Cited

U.S. PATENT DOCUMENTS 6,069,896 A * 5/2000 Borgstahl ............ H04L 12/2803
370/401
6,574,266 B1 * 6/2003 Haartsen ............... H04W 48/10
370/349
(Continued)

FOREIGN PATENT DOCUMENTS

WO WO-01/01717 A1 1/2001
WO WO-2007008174 A1 * 1/2007 ............. H04L 45/20
(Continued)

OTHER PUBLICATIONS

Stojmenovic and Jie Wu, Broadcasting and Activity Scheduling in Ad Hoc Networks, Mobile Ad-Hoc Networking (ch. 7), Wiley, 2004.*
(Continued)

*Primary Examiner* — David R Lazaro
*Assistant Examiner* — Robert A Shaw
(74) *Attorney, Agent, or Firm* — Harrington & Smith

(57) ABSTRACT

There is provided an improved solution for performing beacon broadcasting in a device-to-device communication network. The solution comprises selecting, by a node capable of entering a device-to-device communication network, a channel for broadcasting wherein the selection is based on at least one of the following: the characteristics of the node and the state of the node; and causing a broadcast of information related to at least part of the properties of the node on the selected channel.

24 Claims, 3 Drawing Sheets

Related U.S. Application Data of application No. 13/511,166, filed as application No. PCT/EP2009/065953 on Nov. 27, 2009, now Pat. No. 9,113,395.

(51) Int. Cl.

| | |
|---|---|
| *H04W 4/06* | (2009.01) |
| *H04W 8/00* | (2009.01) |
| *H04W 72/04* | (2009.01) |
| *H04W 48/12* | (2009.01) |
| *H04W 88/06* | (2009.01) |

(52) U.S. Cl.
CPC ......... *H04W 72/02* (2013.01); *H04W 72/048* (2013.01); *H04W 72/0453* (2013.01); *H04W 88/06* (2013.01)

(58) Field of Classification Search
CPC . H04W 72/0453; H04W 8/005; H04W 88/02; H04W 88/06
See application file for complete search history.

(56) References Cited

U.S. PATENT DOCUMENTS

| | | | | |
|---|---|---|---|---|
| 7,830,907 | B1* | 11/2010 | Petranovich | H04W 72/1215 370/432 |
| 2001/0026543 | A1* | 10/2001 | Hwang | H04B 7/2628 370/335 |
| 2002/0087887 | A1* | 7/2002 | Busam | H04L 63/083 726/3 |
| 2003/0235174 | A1* | 12/2003 | Pichna | H04L 63/0853 370/338 |
| 2004/0009770 | A1* | 1/2004 | Sivanandan | H04W 28/18 455/425 |
| 2005/0169219 | A1* | 8/2005 | Serpa | H04L 29/12254 370/338 |
| 2005/0226203 | A1* | 10/2005 | Ho | H04W 48/08 370/349 |
| 2006/0084444 | A1* | 4/2006 | Kossi | H04W 84/18 455/450 |
| 2006/0171332 | A1* | 8/2006 | Barnum | H04W 8/005 370/254 |
| 2006/0194598 | A1* | 8/2006 | Kim | H04W 48/16 455/509 |
| 2007/0201423 | A1* | 8/2007 | Laroia | H04L 5/0035 370/345 |
| 2007/0218897 | A1* | 9/2007 | Yukizaki | H04W 72/04 455/432.1 |
| 2008/0112334 | A1* | 5/2008 | Laroia | H04L 5/0035 370/254 |
| 2008/0259877 | A1* | 10/2008 | Habetha | H04W 74/002 370/336 |
| 2009/0016250 | A1* | 1/2009 | Li | H04W 48/08 370/310.1 |
| 2009/0028090 | A1* | 1/2009 | Sim | G06F 16/78 |
| 2009/0063419 | A1* | 3/2009 | Nurminen | G06F 16/78 |
| 2009/0080389 | A1* | 3/2009 | Messerges | H04W 72/02 370/338 |
| 2009/0161591 | A1* | 6/2009 | Ahmadi | H04L 5/14 370/312 |
| 2009/0213722 | A1* | 8/2009 | Backes | H04L 47/125 370/201 |
| 2009/0262693 | A1* | 10/2009 | Wang | H04W 48/12 370/329 |
| 2009/0323848 | A1* | 12/2009 | Guthy | H04B 7/0426 375/267 |
| 2010/0135267 | A1* | 6/2010 | Strutt | H04W 48/12 370/338 |
| 2010/0150120 | A1* | 6/2010 | Schlicht | H04W 4/20 370/338 |
| 2010/0189027 | A1* | 7/2010 | Ishida | H04W 48/12 370/312 |
| 2010/0271959 | A1* | 10/2010 | Qi | H04L 41/12 370/248 |
| 2010/0272037 | A1* | 10/2010 | Lee | H04W 52/0235 370/329 |
| 2011/0026472 | A1* | 2/2011 | Reumerman | H04W 72/02 370/329 |
| 2011/0063995 | A1* | 3/2011 | Chen | H04L 29/12028 370/254 |
| 2011/0082940 | A1* | 4/2011 | Montemurro | H04L 69/24 709/227 |

FOREIGN PATENT DOCUMENTS

| | | | |
|---|---|---|---|
| WO | WO-2009/024950 A2 | 2/2009 | |
| WO | WO-2009024950 A2 * | 2/2009 | ............ H04W 72/02 |
| WO | WO-2009054673 A2 * | 4/2009 | ........ H04W 52/0235 |
| WO | WO-2009/129144 A2 | 10/2009 | |
| WO | WO 2009/138820 A1 | 11/2009 | |
| WO | WO-2009138820 A1 * | 11/2009 | ........ H04W 72/0406 |

OTHER PUBLICATIONS

Janis et al, Device-to-Device Communication Underlaying Cellular Communications Systems, Int. J. Communications, Network and System Sciences, 2009, 3, 169-247.*

Stojmenovic et al.; "Broadcasting and Activity Scheduling in Ad Hoc Networks"; Mobile Ad-Hoc Networking, Chapter 7; Wiley; 2004.

Janis et al.; "Device-to-Device Communication Underlaying Cellular Communications Systems"; Int. J. Communications, Network and System Sciences; vol. 3; 2009; pp. 169-247.

* cited by examiner

DEVICE-TO-DEVICE COMMUNICATION

CROSS REFERENCE TO RELATED APPLICATIONS

This application is a divisional Application of co-pending U.S. patent application Ser. No. 14/793,807 filed on Jul. 8, 2015, now allowed, which is a divisional of application Ser. No. 13/511,166 filed on Jun. 18, 2012, now U.S. Pat. No. 9,113,395, filed as application No. PCT/EP2009/065953 on Nov. 27, 2009, the disclosure of which is incorporated herein by reference in its entirety.

FIELD

The invention relates generally to mobile communication networks employing device-to-device (D2D) communication. More particularly, the invention relates to the beacon broadcasting in the D2D communication.

BACKGROUND

Typically cellular communication networks are based on a fixed infrastructure for managing the radio communication within the network. In radio communication networks, such as the Long Term Evolution (LTE) or the LTE-Advanced (LTE-A) the fixed infrastructure comprises base stations (Node B, NB) or evolved NBs (eNB). The eNB is used to serve user terminals locating in the coverage area of the eNB. In order to facilitate the flexibility of the network and enhance the coverage area, also so called mobile cellular device-to-device (D2D), also referred to as mobile-to-mobile (M2M), machine-to-machine (M2M), terminal-to-terminal (T2T) or peer-to-peer (P2P), may be applied.

Basic idea behind the D2D is that mobile users can directly communicate with each other. The direct D2D communication comprises at least two relatively closely located devices communicating with each other directly instead of a conventional communication link for end-to-end (E2E) communication, in which the source device transmits data to the destination device via the eNB. The two devices in the D2D communication may apply radio resources of the mobile communication network, thus sharing the resources with devices that are communicating with the eNB in the conventional link. This way the users of the devices may obtain better quality of service (QoS), new applications and increased mobility support. The connections between the user equipment (UE) participating in the D2D network, may be set up in an ad-hoc manner, with or without the control of the eNB. One of the fundamental to the D2D is to enable devices to discover each other and their services when the devices are within radio coverage of each other. For this, often applied solution is to have the devices broadcast some individual predefined beacons that are unique among the local network of D2D devices to advertise itself for node discovery.

Problem with the current practice arises when considering a D2D network employing devices, such as UEs, who are roaming around in large number and in unpredictable manner. Accordingly, it is cumbersome to ensure the large number of UEs to perform beaconing reliably with no or very little impact on the operation and performance of the cell of the eNB. Therefore, an improved solution is needed.

BRIEF DESCRIPTION OF THE INVENTION

Embodiments of the invention aim in improving the utilization of broadcasts in the device-to-device communication network. According to an aspect of the invention, there are provided methods as specified in claims 1 and 26.

According to an aspect of the invention, there are provided apparatuses as specified in claims 13 and 31.

According to an aspect of the invention, there are provided computer program products as specified in claim 25 and 36. Embodiments of the invention are defined in the dependent claims.

LIST OF DRAWINGS

In the following, the invention will be described in greater detail with reference to the embodiments and the accompanying drawings, in which FIG. 1 illustrates possible methods for communication in a mobile communication network;

Figure 8:
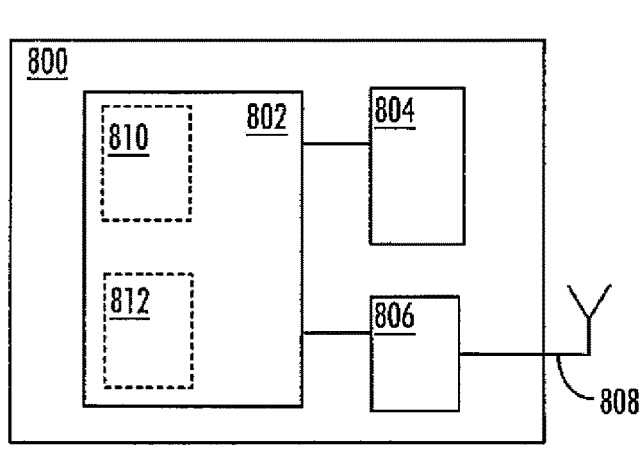
Figure 9:
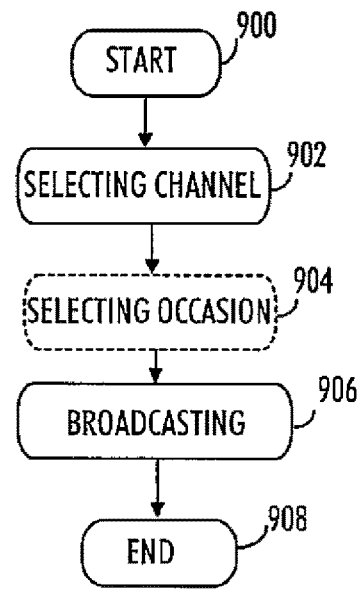
Figure 10:
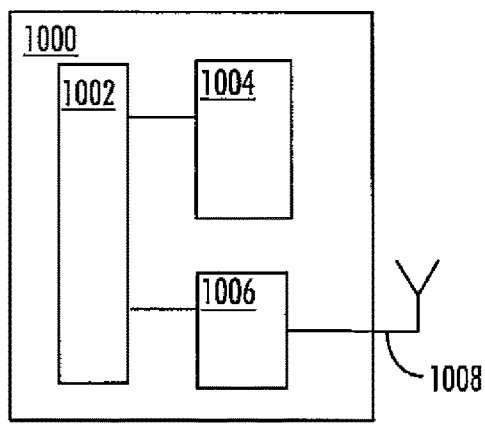
Figure 11:
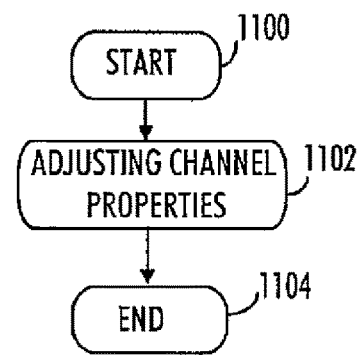

FIG. 8 presents an apparatus capable of broadcasting in the device-to-device communication network, according to an embodiment;

FIG. 9 shows a method of broadcasting beacons in the device-to-device communication network, according to an embodiment;

FIG. 10 shows an apparatus capable of controlling radio communications in the device-to-device communication network, according to an embodiment; and FIG. 11 shows a method for part of the operations performed by an apparatus controlling the D2D communications, according to an embodiment.

DESCRIPTION OF EMBODIMENTS

The following embodiments are exemplary. Although the specification may refer to "an", "one", or "some" embodiment (s) in several locations of the text, this does not necessarily mean that each reference is made to the same embodiment (s), or that a particular feature only applies to a single embodiment. Single features of different embodiments may also be combined to provide other embodiments. Although this invention is described using LTE (or Evolved universal mobile telecommunications system (UMTS) terrestrial radio access network (UTRAN) as a basis, it could be applicable to any other wireless mobile communication systems as well. For example, the embodiments may be applied under the UMTS or the Global system for mobile communications (GSM), etc. The telecommunication system may have a fixed infrastructure providing wireless services to subscriber terminals.

Figure 1:
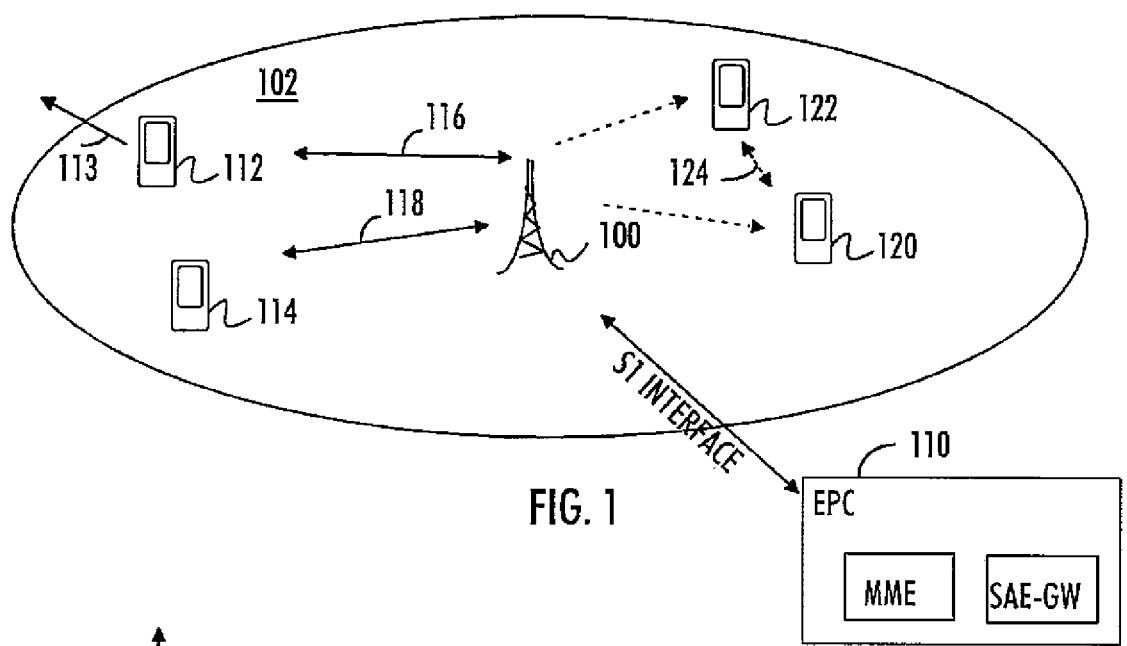

FIG. 1 illustrates possible methods for communication in a mobile communication network. The communication network may comprise a base station 100. The base station 100 may provide radio coverage to a cell 102, control radio resource allocation within the cell 102, perform data and control signaling, etc. The cell 102 may be a macro cell, a micro cell, or any other type of cell where radio coverage is present. Further, the cell 102 may be of any size or form de-pending on the antenna aperture. That is, it may not be of oval or circular form, but any other form is applicable to embodiments. The cell 102 controlled by the base station 100 may be divided into sectors, but such a scenario is not illustrated in greater detail in order to keep the focus on the invention.

The base station 100 may be configured to provide communication services according to at least one of the following communication protocols: Worldwide Interoperability for Microwave Access (WiMAX), Universal Mobile Telecommunication System (UMTS) based on basic wideband-code division multiple access (W-CDMA), high-speed packet access (HSPA), long-term evolution (LTE), and/or LTE advanced (LTE-A). The base station 100 may additionally provide the second generation cellular services based on GSM (Global System for Mobile communications) and/or GPRS (General Packet Radio Service). The present invention is not, however, limited to these protocols.

The base station 100 may be used by multiple network operators in order to provide radio coverage from multiple operators to the cell 100. The base station 100 may be a node B, an evolved node B (eNB) as in LTE-A, a radio network controller (RNC), or any other apparatus capable of controlling radio communication within the cell 102.

For the sake of simplicity of the description, let us assume that the base station 100 is an eNB. The development of E-UTRAN is concentrated on the eNB 100. All radio functionality is terminated here so that the eNB is the terminating point for all radio related protocols. The E-UTRAN may be configured such that an orthogonal frequency division multiple access (OFDMA) is applied in downlink transmission, whereas a single carrier frequency division multiple access. (SC-FDMA) may be applied in uplink, for example. In the case of multiple eNBs in the communication network, the eNBs may be connected to each other with an X2 interface as specified in the LTE The eNB 100 may be further connected via an SI interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles the user plane functions including packet routing and forwarding, E-UTRAN idle mode packet buffering, etc. The user plane bypasses the MME plane directly to the SAE-GW. The SAE-GW may comprise two separate gateways: a serving gateway (S-GW) and a packet data network gateway (P-GW). The MME controls the tunneling between the eNB and the S-GW, which serves as a local anchor point for the mobility between different eNBs, for example. The S-GW may relay the data between the eNB and the P-GW, or buffer data packets if needed so as to release them after an appropriate tunneling is established to a corresponding eNB. Further, the MMEs and the SAE-GWs may be pooled so that a set of MMEs and SAE-GWs may be assigned to serve a set of eNBs. This means that an eNB may be connected to multiple MMEs and SAE-GWs, although each user terminal is served by one MME and/or S-GW at a time.

Referring to FIG. 1, the cell 102 is associated with the base station 100 controlling communications within the cell 102. The base station 100 may control a cellular radio communication link established between the base station 100 and terminal devices 112 to 114 located within the cell 102. A conventional communication link for end-to-end communication is such where the source device transmits data to the destination device via the base station 100. That is, radio communication links 116 and 118 are established between the terminal device 112 and the base station 100, and between the terminal device 114 and the base station 100, respectively. Therefore, the user terminals 112, 114 may communicate with each other via the base station 100.

According to an embodiment, device-to-device (D2D) connections may be established among terminal devices. Communication links between two devices are established, e.g., between terminal devices 120 and 122 in FIG. 1. A D2D communication link 124 may be based on any radio technology such that the terminal devices 120 and 122 involved in the communication may apply communication according to any of a plurality of radio access technologies.

The eNB 100 may be responsible for controlling the communication link 124, as shown with dashed lines in FIG. 1. The radio access technology of the direct communication link 124 may operate on the same frequency band as the conventional communication link and/or outside those frequency bands to provide the arrangement with flexibility. Thus, the base station 100 may be responsible for allocating radio resources to the communication link 124 as well as for the conventional communication links 116 and 118. For example, the cellular network may operate in FDD duplex mode and the D2D communication link 124 may apply TDD duplex mode utilizing uplink, downlink or uplink and downlink radio resources of the cellular network under the control of the base station 100. Thus, the direct communication link may use the same networking protocols as of the supporting cellular system. The nodes 112, 114, 120 and 122 may be static or dynamic. This means that the nodes, such as user terminals, user equipment, palm computers or any apparatuses capable of operating in a communication network, may stay still or they may be moving, as shown with a reference numeral 113 in FIG. 1. Let us consider the aspect of moving nodes later.

According to an embodiment, the user terminals 120 or 122, also called as network nodes, notify their existence and properties when they wish to participate in an existing D2D network or establish a new D2D network. For this purpose they may broadcast a message notifying the existence of the node in the network. This is called as beaconing, i.e., the node 120 or 122 broadcasts an individual beacon receivable by any node 122 or 120 in the proximity of the node 120 or 122, respectively. The node 120, 122 may access a beacon channel, where the beacon channel denotes a group of resource elements designated for advertising the availability and a set of essential attributes of the node 120, 122. The transmissions of D2D beacon channels may be synchronized, having a predefined semi-static channel format and allocation schedule.

Given the possibility of having a huge number of nodes 120, 122 even in one cell, each node 120, 122 employing D2D communications selects its beacon channel for broadcasting such that the occurrence of collisions on the selected beacon channel is avoided as much as possible. Consequently, according to an embodiment, a node 120, 122 capable of entering the D2D communication network, selects the channel for broadcasting from a set of channels dedicated for informing node properties in the D2D communication network, wherein the selection is based on at least one of the following: the characteristics of the node and the state of the node. The chosen channel may be called the selected beacon channel. As a result the, node 120, 122 may cause a broadcast of information related to the properties of the node 120, 122 on the selected channel.

Further, the node 120, 122 selects an occasion for applying the selected channel for broadcasting from a set of occasions on the basis of at least one of the following: the characteristics of the node and the state of the node. Accordingly, the node 120, 122 may cause a broadcast of information related to at least part of the properties of the node on the selected channel at the selected occasion.

The selections of the channel and the occasion may be based on at least one of the following: the characteristics of the node and the state of the node. This means that either or both can be used as a basis for selection. The state of the node may define the current status of the node. Therefore, the state of the node may define the condition in which the node currently is. The state may comprise information whether the node 120, 122 is in idle state or in active (connected) state, whether the node 120, 122 is static or dynamic, what is the type of the node 120, 122, etc. The characteristics of the node may define static, semi-static or time-variant properties that the node currently has. Thus, the characteristics of the node 120, 122 may comprise information regarding identification information, routing properties, authentication and authorization capabilities, hierarchical level, velocity, direction of movement, location, supported service and standards, etc.

A node employing the D2D communication network may advertise multiple kinds of information on its channel to other nodes in the proximity. The information with regards to properties, such as available capabilities and the current state, has to be repeated at regular intervals as the counterparts may reach or leave the coverage area of the node 120, 122 all the time in a mobile cellular system. Therefore, the mobile D2D networks are in contrast to conventional networks where the UEs (nodes) exchange data only with the eNBs and where such an advertisement of the node's properties is only partially needed during initial access or handover.

The list of information elements which the node 120, 122 may provide via the broadcast in the beacon channel may comprise information such as the type of the node, the status of the node, supported standards and protocols, basic routing capabilities, free routing capabilities, service and transmission requests, allocated resources, own identifiers and identifiers of designated sources or sinks of requested services, the location of the node, the velocity of the node, the direction of the movement, etc.

The type of the node may reveal is the node a user terminal, a palm computer, a mobile phone, a home unit, etc. The status of the node 120, 122 may provide information revealing is the node in an idle state or in an active state.

Figure 4:
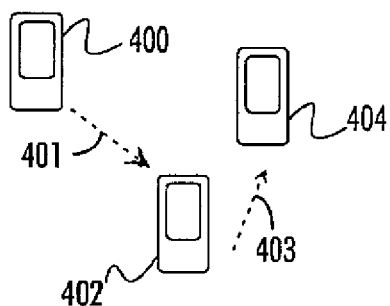
FIG. 4 illustrates a routing strategy according to an embodiment.
Figure 5:
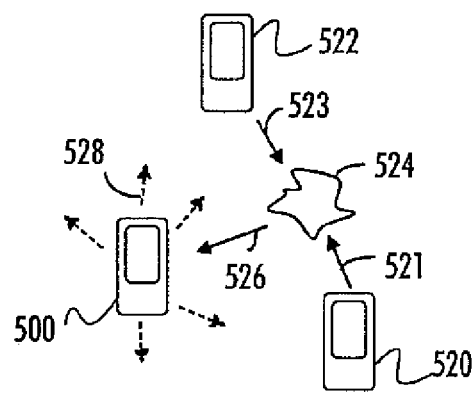
FIG. 5 shows a detection of collision according to an embodiment.

The node 120, 122 may be able to perform routing or forwarding of data to another node in a mesh of network nodes. This is shown with more details in FIG. 4. The node 402 having broadcasted a possibility to aid in routing or forwarding of data to a third node, may receive a communication establishment request from a node 400 desiring to perform data transfer with a node 404. The node 402 may accept the request and establish a communication connection 401 with the node 400 and also, separately from the connection 401, establish a communication connection 403 with the node 404. Therefore, the data that is received from the node 400 via the connection 401 may be forwarded or routed to the node 404 via the node 402 and via the connection 403. For this reason, the node 402 broadcasting the beacon, may inform other nodes 400, 404 about the capability to route and/or forward data.

The available routing capabilities may depend on the requested services and data transmissions of the node. The allocated radio resources of the node therefore play an important role in the availability of the node in D2D communication network. It should be noted that even though the node 120, 122 of FIG. 1 may be part of the D2D network, it may perform data transfer or other services with the eNB 100 of the cell 102, which may require radio resources as well. The possible services the node 120, 122 may be associated with may include voice services, video applications, data transfer, for example.

Further, the node 120, 122 may disclose the identification information of the node, or the identification information of a source/sink of any associated node. The identification information identifies the node in the network.

Obviously, some of these information elements are static or at least semi-static while others change on a rather small time scale. Another significant difference re-sides in the robustness against transmission errors, e.g. identities should be received correctly in any case while transmission errors in some other information element (s) are less severe.

Accordingly, the information elements may be grouped according to their variability over time and the required coding protection. The number of resource elements assigned to a specific beacon channel may be reduced when the number of information elements requiring to be transmitted on the specific channel at a specific instant is not as high as if all the information elements were to be transmitted at every broadcast. The specific group may be transmitted in regular intervals. Therefore, certain information may be transmitted more frequently than another type of information.

According to an embodiment the node 120, 122 decides whether to include a certain type of information to the broadcast at a certain occasion on the basis of at least one of the following: the temporal variability of the type of information and the required reliability of the type of information. The node 120, 122 may decide not to include a certain information element in the broadcast if the information element is static or semi-static in nature. It may be sufficient to broadcast the information element in the beginning of the communication and then restrain from broadcasting that specific information element in the following broadcast until a certain amount of time has passed or the value of the information has changed, for example. Further, for those information elements for which the effect of transmission errors is less severe, it may be appropriate to apply delta, or differential, reporting. In delta reporting the full value of the information element is transmitted only every $n^{th}$ broadcast whereas the other n−1 transmissions only indicate the difference between the current value and the value of the last pre-ceding transmission of the information element.

The set of orthogonal channels dedicated for the purposes of beaconing may be set by the configuration of the cell 102 or by the eNB 100 of the cell 102. The number of channels in the set is not limited to any specific value: it may comprise only few channels but there may be hundreds of dedicated channels for this purpose. However, the larger the number of dedicated channels is, the larger is the (unnecessary) storage of radio resources. For the sake of clarity, let us refer the number of channels dedicated for this purpose as $N_1$, i.e., the indexes of the dedicated channels run from 0, 1, 2, . . . $N_1$−1. The orthogonal nature of the channels may be obtained by separating the channel in a time-, a frequency-, or a code-domain, for example.

Figure 2A:
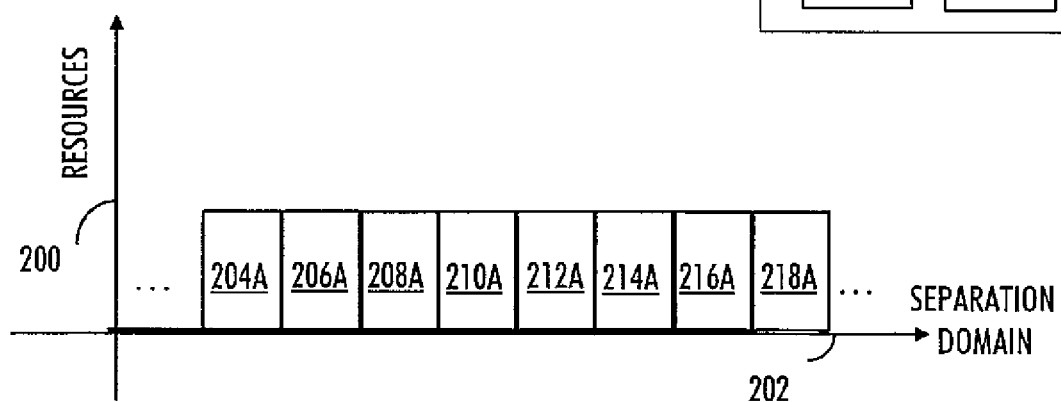
FIG. 2A shows a possible set of channels, according to an embodiment.

FIG. 2A shows a possible set of channels dedicated for the broadcasting purposes. The number of channels 204A to 218A is eight, for example. That is, $N_1$=8. According to an embodiment, each of the channels 204A to 218A have equal amount of radio resources 200, and the channels 204A to 218A are separated in a separation domain 202, which may be the time-, the frequency-, or the code-domain, for example. The broadcasting node may then basically select one of the channels 204A to 218A for broadcasting purposes when entering the cell. The eNB may provide the node information regarding the set of channels.

Figure 2B:
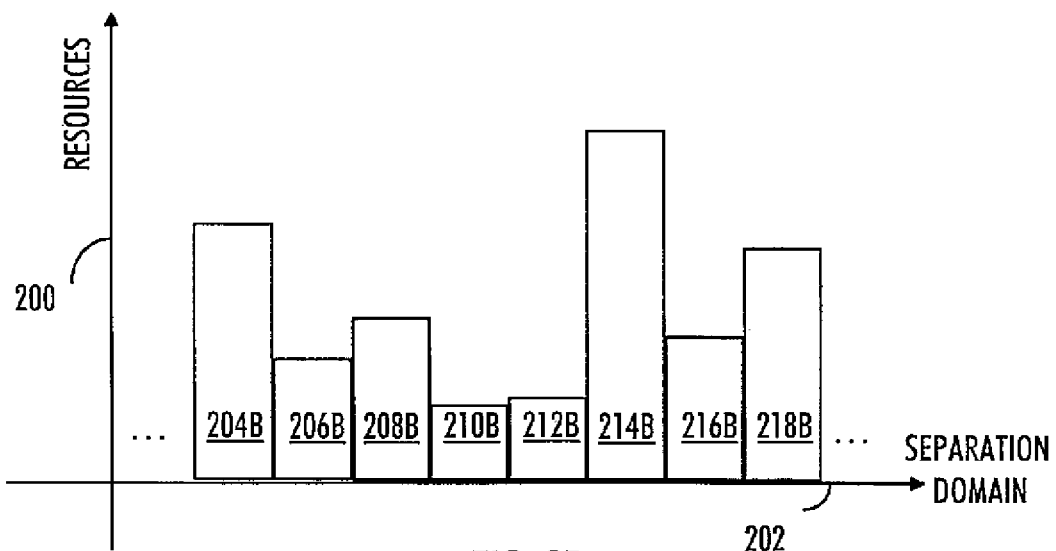
FIG. 2B shows another possible set of channels, according to an embodiment.

FIG. 2B shows another possible set of channels 204B to 218B. Here, according to another embodiment, each channel 204B to 218B in the set of channels is associated with a certain adjustable set of properties regarding at least one of the following: the set and format of at least one information element to be broadcasted the channel and schedule for broadcasting at least one information element on the channel. Further, amount of available radio resources on the channel may be determined by the properties of the channel. The channel 214B has superior resources available when compared to the resources of the channel 212B, for example. That is, when selecting a certain channel 204B to 218B, the node broadcasts information according to the limitations of the channel 204B to 218B. This may mean limitations regarding the set of information elements that can be advertised, the format of the information element that are advertised, the amount of available resources 202, or the possibility to transmit certain information elements according to a predefined schedule, or limitations to all of the above. A channel 204B to 218B may also have certain resources dedicated to certain information elements, such as for the velocity, for the routing information, for the identification information, etc. The predefined schedule in a specific channel 204B to 218B may be such that some information is transmitted only every 40 milliseconds, whereas some information is transmitted every 10 milliseconds.

In other words, a specific channel at a specific occasion may be associated with a predefined set of properties related to the sending node through the information elements the specific channel conveys at the specific occasion. Therefore, the channel can be seen to comprise a specified format which comprises only certain predefined information elements. Each node may use the appropriate form according to the node properties it wants to advertise.

The node may obtain knowledge of the set of properties currently associated with the channels 204B to 218B in order to select the channel 204B to 218B associated with the set of properties that corresponds the most with the requirements of the node regarding the advertisement of the at least one information element. The knowledge of the channels 203B to 218B may be informed by the eNB of the cell via service channels or special beacon channels, or the knowledge may be predefined by the standard, for example. The requirements of the node may be derived from the characteristics and/or the state of the node. If the node has available routing capabilities, the node may select a channel 204B to 218B which has appropriate resources and schedule for broadcasting routing information, for example. On the other hand, if the node requires access to a certain service, the node may select a channel 204B to 218B which has appropriate resources and schedule for broadcasting the desire to use the service. These represent some examples of selecting the channel according to the characteristics and/or state of the node.

Further, the nodes may be defined by profiling them according to the relevant information elements the node comprises related to the characteristics and the state of the node. The profiles may distinguish a fast moving node from a fixed node, a relay node or a base station, for example. The various profiles may comprise different information elements. The length of a certain information field associated with the same information element may be different in two profiles and/or the effective resolution of the physical values may be different for the two profiles. As a consequence, a node with a certain profile, may select a channel with certain properties. The node may then cause a broadcast of node information on the selected channel according to the properties currently associated with the selected channel.

The node may reselect a new channel associated with the correct profile once the characteristics of the node and/state of the node have changed such that the profile or properties associated with the node's current channel are no longer appropriate. The node may release its current channel when the new channel is in effect. The node may further advertise its new channel in a kind of termination message on the current, to-be-released channel.

Alternatively or in addition, the node may release its beacon channel once the node has reached a stable communication configuration which fully satisfies the service requests of the node and exhausts the routing or relaying capabilities of the node. The UE, or the node, in this state will no longer need to advertise its service requests and routing capabilities or any other characteristics to other nodes on the channel but may exchange such information to a certain extent on dedicated channels with the attached nodes.

According to an embodiment, the information elements of the node's properties are combined in the broadcasts by exploiting correlations between basic information elements which are typically valid for nodes associated with a certain profile.

Figure 3:
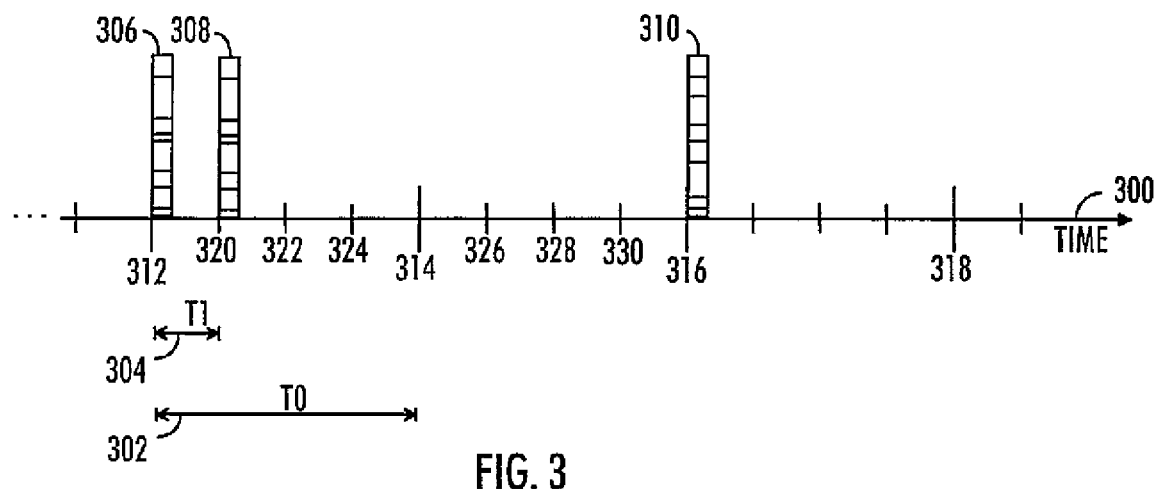
FIG. 3 illustrates a time line of occasions, according to an embodiment.

As mentioned, according to an embodiment, the node may select the occasion for applying the selected channel for broadcasting. Let us consider this with more details. The occasion may be chosen from a set of occasions and the selection may be performed on the basis of the characteristics of the node or the state of the node, or on the basis of both of the above. FIG. 3 shows a time line 300 comprising a plurality of occasions 312 to 330. It should be noted that also occasions marked with vertical line are valid occasions even though not marked with a reference numeral for the sake of clarity. The occasion denotes a point of time when the broadcast is transmitted.

The period between occasions 312 and 314, between 314 and 316, and between 316 and 318 is $T_0$ 302. The time period from one occasion to the next occasion is referred as Ti 304. Each node in the D2D network may broadcast on the selected beacon channel every $T_0$ (or multiple thereof) and listen to each others' beacon broadcasts every Ti (or multiple thereof). $T_0$ and Ti may be predefined time intervals, possibly equal to multiple of the cellular system's frame duration, such as 10 ms in the LTE. As said, the node selects the occasion from a set of occasions. The number of occasions in the set of occasion is determined, according to an embodiment, as: To/Ti and referred to as $N_2$. The $N_2$ occasions may be indexed as 0, 1, 2, . . . , $N_2$-1. If $T_0$=40 ms and $T_1$=10 ms, then $N_2$=4. That is, there are 4 occasions from which the node can choose an occasion for broadcast.

According to an embodiment, a number of occasions separated by a predetermined interval, such as $T_0$, determine a node-specific schedule of occasions for the node. If the node 120 of FIG. 1 selects the occasion 312 for broadcasting, then the next broadcast from the node 120 may take place at the occasion 314 because this is separated from the occasion 312 by $T_0$, for example. A third broadcast may take place at the occasion 316. In contrast, the node 122 of FIG. 1 may select the occasion 320 as the occasion for the broadcast. Then the next broadcast from the node 122 may take place at the occasion 326. The node-specific schedule for the broadcasts may change in time due to reasons explained with reference to FIG. 2B, due to collision detection, or due to configuration, for example.

After obtaining the node-specific schedule, broadcasts of information related to at least part of the properties of the node on the selected channel according to the determined node-specific schedule of occasions may be performed.

FIG. 3 shows possible sets of channels 306 to 310. It can be seen that the set 306 to 310 each comprise a certain amount of channels, possibly each channel having certain properties. This is represented by the spacing between the horizontal lines in the set of channels. Although not shown in FIG. 3, each of the channels in at least one of the sets 306 to 310 could comprise channels of equal properties.

As said, the properties of the channels are adjustable. According to an embodiment, the properties of at least part of the channels are adjusted on the basis of the current data transfer requirements. The data transfer requirements may be monitored within at least one cell where the D2D communication network operates. This can be seen when comparing sets 308 and 310. The set 310 has different properties in the eight channels than the eight channels in the set 308. The adjustment can be performed by the eNB of the cell having knowledge regarding the data transfer requirements.

Figure 7:
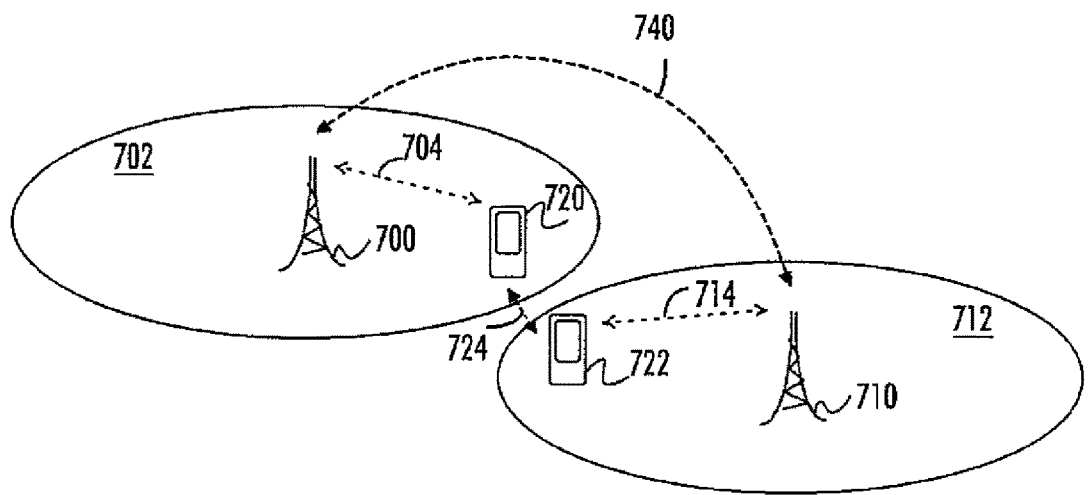
FIG. 7 illustrates inter-operation of base stations according to an embodiment.

However, as shown in FIG. 7, if may be that the node 720 entering the D2D communication network locates in the edge of the cell 702 close to another cell 712, then the eNBs 700 and 710 of the own cell 702 and the neighboring cell 712 may inter-operate in adjusting the channel properties. The eNB 700 of the own cell 702 may request information regarding the situation in the neighboring cell 712 via an X2 interface 740. This is because the node 720 entering the D2D network may establish a D2D connection 724 with a node 722 locating in the neighboring cell 712. The eNB 700 and 710 may inform at least one of the nodes 720 and 722 via connections 704 and 714, respectively.

As mentioned, the channel and/or the occasion may be selected on the basis of the characteristics of the node and/or the state of the node. Therefore, the node wishing to broadcast information may select the channel and the occasion for broadcast based on whether the node is active or not, whether the node is moving or not, etc. For example, a fixed node may not include the information element "velocity" and "direction" in the broadcast and therefore may select a channel that has fewer resources available, yet having a possibility to broadcast, for example, routing information. On the other hand, a fast-moving node may in turn not advertise information elements about routing capabilities as it will not be considered as an appropriate anchor point for routing or relaying by other UEs or network nodes. However, the dynamic node may wish to broadcast the motion related parameters with a relatively high temporal resolution. As the velocity may be provided in relation to the fixed eNB, there might be possibilities even for dynamic node to serve as routing point for another node with approximately the same velocity and direction. Such scenario may take place in a bus, for instance. The other node listening to the broadcast may obtain knowledge that there is a node in the proximity that moves in the same direction with the same velocity. Therefore, they might establish a D2D connection with each other, if needed.

According to an embodiment, the node may select the channel and the occasion on the basis of the identification information of the node. There are many types of identification information available. Some of them are cell-specific whereas some are fixed. Examples of identification information include an international mobile equipment identifier (IMSI), a temporary international mobile equipment identifier (T-IMSI), paging token of the node and a cell specific radio network temporary identifier (C-RNTI). Some of the identifiers are associated only with active nodes 102, 122, such as the C-RNTI, whereas some of them can be applied with any node 120, 122 regardless of the state of the node, such as IMSI, T-IMSI or the paging token.

The identification information may also be formed as a function of any specific identification. For example, the identification information may be obtained by applying the following: IMSI mod R, where R is a reference integer. Any other function may be used as well.

According to an embodiment, the node may select the channel for broadcasting by applying the following operation: $n_{ID}$ modulo $N_1$, where $n_{ID}$ is the identification information of the node and Ni is the number of the channels in the set of channels. Other functions may be applied as well. For exam-pie, if there are eight channels in the set, i.e., $N_1=8$ and the identification information is a 32 bit value corresponding a decimal value of 50 in this example, the index for the channel to be selected is 2 (50 mod 8=2). Looking at FIG. 2A, the channel 208A would be selected, assuming that channel 204A is indexed with 0 and channel 206A is indexed with 1 This way the channels in the set of channels may be distributed for the nodes rather evenly.

Further, according to an embodiment, the following operation may be applied in selecting the occasion: floor $(n_{ID}/Ni)$ modulo $N_2$, where $n_{ID}$ is the identification information of the node, Ni is the number of the channels in the set of channels and $N_2$ is the number of occasions in the set of occasions. $N_2$ may be obtained with $T_0/Ti$, as explained. Assuming $N_1=8$, $n_{ID}=50_{10}$ and $N_2=4$, the operation of floor $(n_{ID}/Ni)$ mod $N_2$ results in 2. Next the node may select the occasion for broadcasting by mapping the result of the above operation to a system frame number SFN=SFN($ni_D$) and SFN($ni_D$) mod $N_2$=floor $(n_{ID}/Ni)$ mod $N_2$.

The selected SFN of the cell timing provides the time occasion when the broadcast is to be performed. Together with the channel selection, the nodes which may select the same beacon channel may be resolved to transmit in different occasions to minimize possible collision of broadcasts.

According to an embodiment, a node listens to the selected channel at the selected occasion prior to broadcasting. That is, before the node performs the beaconing, it listens to the channel it intends to transmit the beacon. The reason for listening is that if a beacon signal from another node is detected on the same beacon channel, the listening node obtains knowledge that another node has selected the same channel and the same occasion for broadcasting. As a result, the listening node may restrain from the broadcast at the current occasion if another signal is detected on the listened channel. The listening node may then perform at least one of the following: causing the broadcast on the same channel at next occasion in the set of occasions, and causing a broadcast on a randomly selected channel. The broadcast on the same channel at next occasion in the set of occasions may denote broadcasting at occasion 328 of FIG. 3 if the current occasion is 326. In other words, the node may postpone the broadcast by a period of Ti. On the other hand, the node may cause a broadcast on a randomly selected channel from the set of channels. The broadcast on the randomly selected channel may take place at the next scheduled occasion, i.e., in this case the node postpones the broadcast by a period $T_0$, if $T_0$ is the selected interval of the scheduled occasions. The node may then listen to the channel again until it finds a free channel at a certain occasion. After finding a free channel at the certain occasion, the node may start beaconing (broadcasting) on the selected channel and occasion with the interval of $T_0$.

However, collision may happen when at least two nodes in proximity of each other select the same channel to listen at the same time and detect the beacon channel is free. According to an embodiment shown in Figure s, at least one node 500 detects a collision 524 of broadcasts 521 and 523 in the D2D communication network. The nodes involved in the collision 524 may be nodes 520 and 522 transmitting the broadcasts 521 and 523, respectively. The collision 524 is detected by listening 526 the D2D network at intervals of Ti, as explained referring to FIG. 3. When the node 500 detects a collision, the node 500 causes a broadcast 528 comprising information regarding the collision. Naturally the broadcast 528 may include also information elements of the node 500, but in addition to those, it comprises information revealing a detected collision. The information may reveal which nodes were involved in the collision 524, for example.

As the node 520, 522 detects the at least one broadcast 528, it may determine a probability for at least one of the following: changing the channel for broadcasting, changing the node-specific schedule of occasions for broadcasting, and performing the broadcast at the next scheduled occasion. The probability is inversely proportional to the number of nodes involved in the collision 524. For example, if many nodes are involved, then the node 520, 522 has-a low probability in applying the same channel at the next scheduled occasion, or applying the next scheduled occasion on the same channel, for instance. Thus, the node 520, 522 may be configured to randomly select a beacon channel to transmit its beacon message in the next scheduled occasion or select the same beacon channel in other beaconing occasion than the current selected one. Alternatively or in addition, the node 520, 528 may apply the determined probability in deciding whether to broadcast at all at the next scheduled occasion. If the node 520, 522 decides not to broadcast at next occasion i+1, then the node will perform the broadcast according to a higher probability at the occasion i+2. This way, it is likely that the next broadcasts from the two nodes 520 and 522 involved in the collision will not collide.

Further, according to an embodiment, in D2D network in which only active nodes are broadcasting, the eNB of the cell may configure those active nodes which may be involved in collision with at least one node-specific probability for at least one of the following: changing the node-specific channel for broadcasting, changing the node-specific schedule of occasions for broadcasting, and performing the broadcast on the thereafter valid apparatus-specific channel and apparatus-specific schedule of occasions (persistent beacon transmission). In other words, the node receives the at least one probability giving guidance to collision avoidance.

Further, as shown in FIG. 7, the eNBs 700 and 710 may coordinate with each other over the X2 interface 740. As a result, the eNBs 700 and 710 (or one of them) may predetermine and configure the identification information of the nodes 720, 722, such as the C-RNTI, to be used in the broadcast channel and occasion selection in order to minimize the risk of a collision. In other words, the node 720, 722 receives identification information from the eNB 700, 710, wherein the identification information is controlled by at least one eNB 700, 710.

In order to obtain minimum overhead and efficient data compression related with data transmissions via beacon channels the node of broadcast may, according to an embodiment, associate at least part of the information related to the properties of the node in the index of the channel and the occasion by selecting a specific channel and a specific occasion from the sets of indexed channels and indexed occasions, respectively. This way, the information is not only within the signals transmitted on the beacon channel but also with the position or index of the employed beacon channel.

A node employing the D2D communications in mobile cellular system will typically receive beacon signals from a plurality of network nodes in its vicinity. Establishing a connection to one or some of those nodes consume radio resources. The maximum cell throughput is achieved when the most suitable counterpart (s) for communication are selected. Therefore, one of the key points in the D2D network is to al-low fast and efficient selection of counterparts for the D2D communication. This is ensured by associating certain information, such as the service request of the node and the routing capabilities of the node, in such a way that the certain information is easily obtained by the receiving node.

Figure 6:
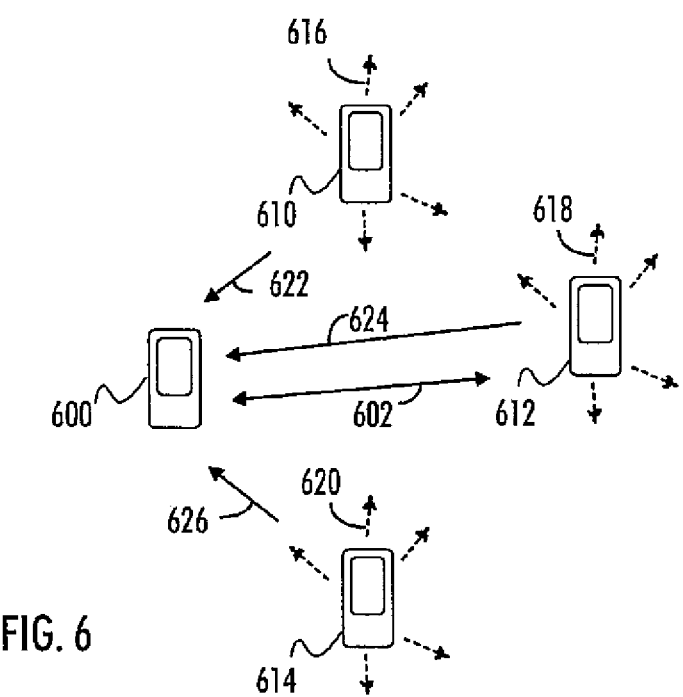
FIG. 6 illustrates a selection of counterpart according to an embodiment.

A node may decide on potential candidates for connection establishment based on the received signal quality. Alternatively or in addition, according to an embodiment shown in FIG. 6, a node 600 detects broadcasts 616 to 620 from other nodes 610 to 614 in the device-to-device communication network. The node detects the broadcasts 616 to 620 by listening to 622 to 626 the broadcasts 616 to 620 at least at some of the intervals of Ti. The node 600 therefore obtains the information associated in the channel and occasion indexes of the detected broadcasts 616 to 620. As a result, the node 600 may determine that there is at least one candidate node for establishing a communication connection in the D2D network when the obtained information of at least one broadcast 616 to 620 indicates that properties of the at least one node corresponds significantly to the requirements of the node 600 itself. This will lead to a list of suitable candidates for connection request/establishment and only the information carried on the actual beacon channels of those candidates need to be evaluated for the final selection. As an exemplary, let us assume that the node 600 is fixed and has a service A available. The node 600, on the basis of the information associated with the indexes of the channel and the occasion, has determined that nodes 610 and 612 are in the need of service A. As a result, the nodes 610 and 612 are selected as the candidate nodes for establishing a communication connection.

The requirements may comprise the service requests and the routing or relaying capabilities, for example. The service requests determine the amount of data to transfer to or from the node and the routing or relaying capability is a measure of ability of the node to forward data from a data source to the designated sink. The routing or relaying capability of the node in a wireless system depends on the supported bandwidth, the available processor power and the current connectivity, i.e. the number of UEs or network nodes in the vicinity from which it can receive data with high signal quality and the routing or relaying capability of these UEs or network nodes.

The node 600 may process information comprised in the broadcasts 616 and 618 received from the at least one candidate node 610 and 612 in order to obtain more knowledge of the properties of the at least one candidate node 610 and 612. This way the node 600 does not have to process the data comprised in the broadcast 620 from the node 614 because the information associated in the indexes indicated that this node 614 does not correspond to the requirements of the node 600. Information a node conveys in its beacon channel and occasion indexes may be obtained by simple power detection procedures on the related resource elements without the need for accurate time and frequency synchronization between sending and receiving nodes. Thus, processing resources and time are not wasted for symbol and bit processing on analysis of the unnecessary broadcasts 620 of the not suitable node 614. Let us further assume that the analysis of the broadcasts revealed that node 610 is in dynamic motion and the node 612 is fixed, assuming that the velocity information was not given in the information associated with the indexes. The dynamic motion of node 610 implies that the connection establishment with the node 610 is not sensible because it is likely that the node 610 may move outside the vicinity of the fixed node 600.

The node 600 may therefore establish the bi-directional communication connection 602 with the node 612 whose properties corresponds the most with the requirements of the node 600 itself. A high cell throughput and stable connections are expected if preferably those nodes get connected to each other which mutually satisfy the service requests of the counterpart. A node with high service requests and routing capability will try to connect to another station with similar requests and similar capability, while a node with high service requests but limited routing capability may in turn preferably try to connect to a complementary UE with high routing capability but limited service requests.

The number of channels $N_1$ in the set of channels, the number of occasions $N_2$ in the set of occasions, the periods $T_O$ and Ti and the SFN mapping may be considered as predefined or cell-specific system parameters, along with configuration information of the channels, i.e., the properties of the channels. These parameters or any limitations thereof may be broadcasted in the cell as part of D2D support system information. Further, the policy of what selection method to apply, i.e., the policy where selection is based on identification information, or the policy where selection is based on the properties of the channel in relation to the requirements of the node, or the policy where both of the above selection solutions are applied may be broadcasted in the cell as part of D2D support system information. This information may as well be pre-defined or cell-specific. The eNB of the cell may provide the information to the nodes, for example.

A very general architecture of an apparatus for employing the broadcasts in the D2D network, according to an embodiment is shown in FIG. 8. FIG. 8 shows only the elements and functional entities required for understanding the apparatus according to an embodiment of the invention. Other components have been omitted for reasons of simplicity. The implementation of the elements and functional entities may vary from that shown in FIG. 8. The connections shown in FIG. 8 are logical connections, and the actual physical connections may be different. It is apparent to a person skilled in the art that the apparatus may also comprise other functions and structures.

The apparatus 800 may comprise a processor 802. The processor 802 may be implemented with a separate digital signal processor provided with suitable software embedded on a computer readable medium, or with separate logic circuit, such as an application specific integrated circuit (ASIC). The processor 802 may comprise an interface such as computer port for providing communication capabilities.

The processor 802 may be, for example, a dual-core processor or a multiple-core processor.

The apparatus 800 may comprise a memory 804 connected to the processor 802. However, memory may also be integrated to the processor 802 and, thus, the memory 804 may not be required. The memory 804 may be used in storing plurality of parameters of the node, such as identification information.

According to an embodiment, the processor 802 may be configured to select a channel and an occasion for broadcasting. More specifically, the processor 802 may comprise a channel selection circuitry 810 for selecting the channel from a set of channels dedicated for informing node existence in the D2D communication network, wherein the selection is based on at least one of the following: the characteristics of the apparatus 800 and the state of the apparatus 800. The processor 802 may also comprise an occasion selection circuitry 812 for selecting an occasion for applying the selected channel for broad-casting from a set of occasions on the basis of at least one of the following: the characteristics of the apparatus 800 and the state of the apparatus 800.

The processor 802 may further be configured to cause a broadcast of information related to at least part of the properties of the node on the selected channel at the selected occasion. In order to broadcast the apparatus 800, such as the node 120, 122 of FIG. 1, may comprise a transceiver (TRX) 806. The TRX 806 may further be connected to one or more antennas 808 enabling connection to and from an air interface. The apparatus 800 and the processor 802 therein may be configured to perform functionalities related to FIGS. 1, 3 to 7 and 9.

FIG. 10 shows a block diagram of an apparatus 1000, such as an eNB, capable of controlling radio communication according to an embodiment. The apparatus 1000 may comprise a processor 1002. The processor 1002 may be implemented with a separate digital signal processor provided with suitable software embedded on a computer readable medium, or with separate logic circuit, such as an application specific integrated circuit (ASIC). The processor 1002 may comprise an interface such as computer port for providing communication capabilities. The processor 1002 may be, for example, a dual-core processor or a multiple-core processor.

The apparatus 1000 may further comprise a memory 1004 connected to the processor 1002. However, memory may also be integrated to the processor 1002 and, thus, the memory 1004 may not be required. The apparatus 1000 may further comprise a transceiver (TRX) 1006. The TRX 1006 may further be connected to one or more antennas 1008 enabling connection to and from an air interface.

The processor 1002 may control the identification information of the at least one node. The processor 1002 may determine at least one node-specific probability as explained with reference to FIG. 7. The processor 1002 may adjust the properties of at least one channel in the set of channels dedicated for informing node properties in a device-to-device communication network.

The eNB may transmit information to the nodes via the TRX 1006. The information may be at least one of the following: the number of channels $N_1$ in the set of channels, the number of occasions $N_2$ in the set of occasions, a period $T_O$ between adjacent scheduled occasions, a period Ti between adjacent occasions in the set of occasions, and the policy for selecting the node-specific channel and occasion for broadcasting. The apparatus 1000, such as the eNB, may be configured to perform functionalities related to FIGS. 1, 3 and 7. Further, the apparatus 1000 may co-operate with at least one neighboring eNB when performing the above described functionalities.

As used in this application, the term ˆcircuitry' refers to all of the following: (a) hardware-only circuit implementations, such as implementations in only analog and/or digital circuitry, and (b) to combinations of circuits and software (and/or firmware), such as (as applicable): (i) a combination of processor (s) or (ii) portions of processor (s)/software including digital signal processor (s), software, and memory(ies) that work together to cause an apparatus to perform various functions, and (c) to circuits, such as a microprocessor (s) or a portion of a microprocessor (s), that require software or firmware for operation, even if the software or firmware is not physically present.

This definition of ˆcircuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

FIG. 9 shows a method for efficient broadcasting in D2D network. The method starts in step 900, In step 902, a node capable of entering a device-to-device communication network selects a channel for broadcasting from a set of channels dedicated for informing node existence in the device-to-device communication network, wherein the selection is based on at least one of the following: the characteristics of the node and the state of the node. Advantageously, but not necessarily, in step 904, the node selects an occasion for applying the selected channel for broadcasting from a set of occasions on the basis of at least one of the following: the characteristics of the node and the state of the node. In step 906, the node causes a broadcast of information related to at least part of the properties of the node on the selected channel (at the selected occasion). The method ends in step 908.

FIG. 11 shows a method for part of the operations performed by an eNB controlling the D2D communications. The method starts in step 1100, In step 1102, the eNB adjusts the properties of at least one channel in the set of channels. The eNB may also assign profiles for the channels, define profiles for the network nodes, control identification information of the node, and assign probabilities to the nodes, as explained earlier. The method ends in step 1104.

The embodiments of the invention offer many advantages. The embodiments provide an efficient beacon resolution for D2D operation taking into account possible configuration and control of cellular systems and anticipated requirements for the D2D such as enhancing efficiency for cellular systems in terms of resource utilization, network performance, service quality and cost.

A low probability of collisions for the execution of beacon access procedures is ensured either by employing a unique identifier in the beacon selection process or by associating the various beacon channels and occasions indexes with specific properties. Both approaches may be combined for controlling the selection from sets of channel and occasion indexes which convey identical or basically equivalent information of related nodes.

The techniques and methods described herein may be implemented by various means. For example, these techniques may be implemented in hardware (one or more devices), firmware (one or more devices), software (one or more modules), or combinations thereof. For a hardware implementation, an apparatus may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of the systems described herein may be rear-ranged and/or complemented by additional components in order to facilitate the achieving of the various aspects, etc., described with regard thereto, and they are not limited to the precise configurations set forth in the given figures, as will be appreciated by one skilled in the art.

Thus, according to an embodiment, the apparatus for performing the tasks of FIGS. 1, 3 to 7 and 9 comprises processing means for selecting a channel for broadcasting from a set of channels dedicated for informing node existence in the device-to-device communication network, wherein the selection is based on at least one of the following: the characteristics of the node and the state of the node, and processing means for causing a broadcast of information related to at least part of the properties of the node on the selected channel.

Further, according to an embodiment, the apparatus for performing the tasks of FIGS. 1, 3 and 7 comprises processing means for adjusting properties of at least one channel in the set of channels dedicated for informing apparatus properties in the device-to-device communication network, wherein the properties of the at least one channel comprise at least one of the following: amount of radio resources available on the at least one channel and schedule for broadcasting certain information about node-specific properties on the at least one channel. The apparatus may further comprise processing means for assigning profiles for the channels, processing means for defining profiles for the network nodes, processing means for controlling identification information of the node, and processing means for assigning probabilities to the nodes.

Further, according to an embodiment, there is provided an apparatus, comprising at least one processor and at least one memory including a computer program code, wherein the at least one memory and the computer program code are configured to, with the at least one processor, cause the apparatus at least to select a channel for broadcasting from a set of channels dedicated for informing node existence in a device-to-device communication network, wherein the selection is based on at least one of the following: the characteristics of the apparatus and the state of the apparatus, and to cause a broadcast of information related to at least part of the properties of the apparatus on the selected channel.

Further, according to an embodiment, there is provided an apparatus, comprising at least one processor and at least one memory including a computer program code, wherein the at least one memory and the computer program code are configured to, with the at least one processor, cause the apparatus at least to adjust properties of at least one channel in the set of channels dedicated for informing apparatus properties in a device-to-device communication network, wherein the properties of the channel comprise at least one of the following: amount of available radio resources and schedule for broadcasting certain information.

Embodiments of the invention may be implemented as computer programs in the apparatus according to the embodiments of the invention. The computer programs comprise instructions for executing a computer process for improving broadcasting of beacons in a D2D network. The computer program implemented in the apparatus may carry out, but is not limited to, the tasks related to FIGS. 1, 3 to 7 and 9.

Further, embodiments of the invention may be implemented as computer programs in the apparatus according to the embodiments of the invention. The computer programs comprise instructions for executing a computer process for improving broadcasting of beacons in a D2D network. The computer program implemented in the apparatus may carry out, but is not limited to, the tasks related to FIGS. 1, 3 and 7.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method comprising:
selecting, by a node of a mobile communication network supporting device-to-device communication for direct communication between at least two devices a channel for broadcasting from a set of channels dedicated for advertising node properties in the device-to-device communication network; and selecting an occasion from a set of occasions for applying the channel;
wherein the occasion is selected based on one or more properties of the channel in relation to requirements of the node, and
wherein an index or position of the channel within the set of channels is determined based on the selected occasion for applying the channel and independent from the one or more properties of the node;
and broadcasting, by the node, of one or more information elements related to one or more properties of the node on the channel.

2. The method of claim 1,
wherein the channel is associated with the one or more properties by at least one of:
a set of the one or more information elements,
a format of the one or more information elements,
a schedule for broadcasting the one or more information elements.

3. The method of claim 1, wherein the set of channels comprises one or more first channels associated with one or more first properties and one or more second channels associated with one or more second properties.

4. The method of claim 1, further comprising:
obtaining by the node information about the one or more properties associated with the index or position of the channel.

5. The method of claim 2, further comprising:
obtaining by the node information about the one or more properties associated with the channel.

6. The method of claim 1, wherein the selecting of the channel is based on at least one of:
type of the node,
the node being in an idle state,
the node being in a connected state,
standards or protocols supported by the node,
basic routing capabilities of the node,
free routing capabilities of the node,
service or transmission requests of the node,
allocated resources of the node,
identifiers of the node,
identifiers of sources or sinks of services requested by the node,
location of the node,
velocity of the node, and
direction of movement of the node.

7. The method of claim 2, wherein the one or more information elements are related to one of:
a type of the node,
the node being in an idle state,
the node being in a connected state,
standards or protocols supported by the node,
basic routing capabilities of the node,
free routing capabilities of the node,
service or transmission requests of the node,
allocated resources of the node,
identifiers of the node,
identifiers of sources or sinks of services requested by the node,
location of the node,
velocity of the node, and
direction of movement of the node.

8. The method of claim 1, wherein the properties of the channel comprise configuration information of the channels and the requirements of the node comprise service request and routing or relaying capability requirements of the node.

9. The method of claim 1, performed with a computer program product comprising program instructions embodied on a non-transitory computer-readable medium, and the program instructions executed by at least one processor.

10. A method comprising:
detecting, by a receiving node of a mobile communication network supporting device-to-device communication for direct communication between at least two devices in the mobile communication network;
broadcasting, from a sending node, of one or more information elements on a channel in a set of channels dedicated for advertising node properties of the sending node in the mobile communication network and on an occasion dedicated for applying the channel selected from a set of occasions for applying the channel, wherein the occasion dedicated for applying the channel is selected based on properties of the channel and requirements of the sending node; and receiving, by the receiving node, one or more information elements on the channel, wherein the channel is using an index or position determined based on the occasion dedicated for applying the channel and independent from the node properties of the sending node.

11. The method of claim 10, wherein the channel is associated with the node properties by at least one of the following:
the set of the one or more information elements,
the format of the one or more information elements,
the schedule for broadcasting the one or more information elements.

12. The method of claim 10, further comprising:
selecting of the sending node by the receiving node for connection request or connection establishment based on at least the index or position of the used channel used by the sending node within the set of channels.

13. The method of claim 12, further comprising:
selecting of the sending node by the receiving node for connection request or connection establishment based on at least one of:
the index or position of the used channel used by the sending node within the set of channels, and
the one or more information elements broadcasted on the channel by the sending node.

14. The method of claim 10, wherein the properties of the channel comprise configuration information of the channels and the requirements of the sending node comprise service request and routing or relaying capability requirements of the sending node.

15. A method, comprising:
configuring a set of channels in a cell of a cellular network dedicated for advertising properties of a node for device-to-device communication; and informing the node about the configured channels;
wherein selection of a channel in the set of channels by the node is based on an occasion dedicated for applying the channel selected from a set of occasions for applying the channel, and wherein selection of the occasion dedicated for applying the channel is based on properties of the channel in relation to requirements of the node; and
wherein the index or position of the channel within the set of channels is determined based on the occasion dedicated for applying the channel and independent from the one or more properties of the node.

16. The method of claim 15, wherein the configuring of the set of channels comprises associating of one or more information elements related to one or more properties of the node with the channel, and wherein the channel is associated with the one or more properties by at least one of the following:
the set of the one or more information elements,
the format of the one or more information elements,
the schedule for broadcasting the one or more information elements.

17. The method of claim 15, further comprising:
exchanging the information for configuring the set of channels with a second cell in the cellular network.

18. The method of claim 15, wherein the properties of the channel comprise configuration information of the channels and the requirements of the node comprise service request and routing or relaying capability requirements of the node.

19. An apparatus comprising:
one or more processors and one or more memories storing computer program code that, when executed by the one or more processors, causes the apparatus to:
select a channel from a set of channels dedicated for advertising node properties in a mobile communication network for device-to-device communication in the mobile communication network and select an occasion dedicated for applying the channel from a set of occasions for applying the channel
wherein the selection of the occasion dedicated for applying the channel is based on properties of the channel in relation to requirements of the apparatus; and
broadcast one or more information elements related to one or more properties of the apparatus on the channel, wherein an index or position of the channel within the set of channels is determined based on the selected occasion for applyinq the channel and independent from the one or more properties of the apparatus.

20. The apparatus of claim 19, wherein the properties of the channel comprise configuration information of the channels and the requirements of the apparatus comprise service request and routing or relaying capability requirements of the apparatus.

21. An apparatus comprising:
one or more processors and one or more memories storing computer program code that, when executed by the one or more processors, causes the apparatus to:
detect broadcasting, by a sending node, one or more information elements on a channel in a set of channels dedicated for advertising node properties of the sending node in a mobile communication network for device-to-device communication in the mobile communication network and on an occasion for applying the channel selected from a set of occasions for applying the channel;
wherein the occasion dedicated for applying the channel is based on properties of the channel and requirements of the sending node, and
wherein an index or position of the channel used by the sending node within the set of channels is determined based on the occasion dedicated for applying the channel and independent from one or more properties of the sending node.

22. The apparatus of claim 21, wherein the properties of the channel comprise configuration information of the channels and the requirements of the sending node comprise service request and routing or relaying capability requirements of the sending node.

23. An apparatus comprising:
one or more processors and one or more memories storing computer program code that, when executed by the one or more processors, causes the apparatus to:
configure a set of channels in a cell of a cellular network dedicated for advertising properties of a node for device-to-device communication; and
send information to the node about the configured channels; wherein selection of a channel in the set of channels by the node is based on at least one of the following:
the characteristics of the node and a state of the node,
wherein the information comprises an occasion dedicated for applying the channel selected from a set of occasions dedicated for applying the channel, and wherein the occasion dedicated for applying the channel is based on properties of the channel and requirements of the node, and wherein an index or position of the channel within the set of channels is determined based on the occasion dedicated for applying the channel and independent from one or more properties of the node.

24. The apparatus of claim 23, wherein the properties of the channel comprise configuration information of the channels and the requirements of the node comprise service request and routing or relaying capability requirements of the node.

\* \* \* \* \*